May 26, 1925.  
M. L. CRUM  
POT WASHING DEVICE  
Filed Aug. 22, 1923  
1,539,718  
3 Sheets-Sheet 1

May 26, 1925.

M. L. CRUM

POT WASHING DEVICE

Filed Aug. 22, 1923

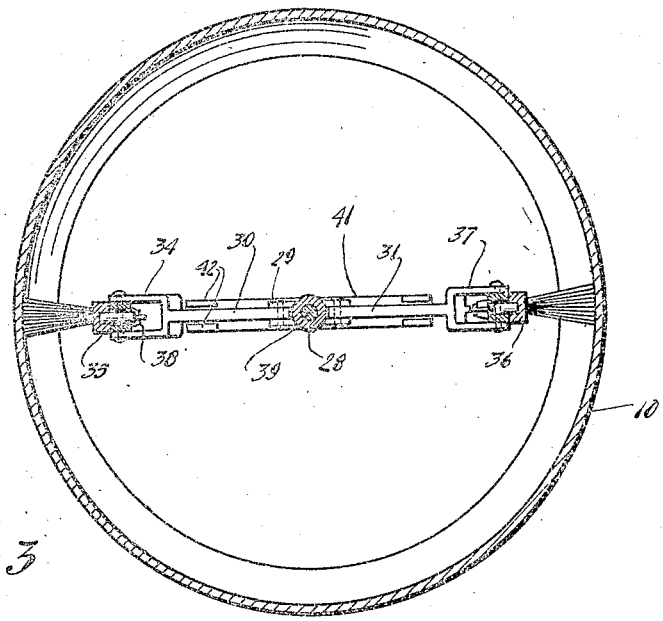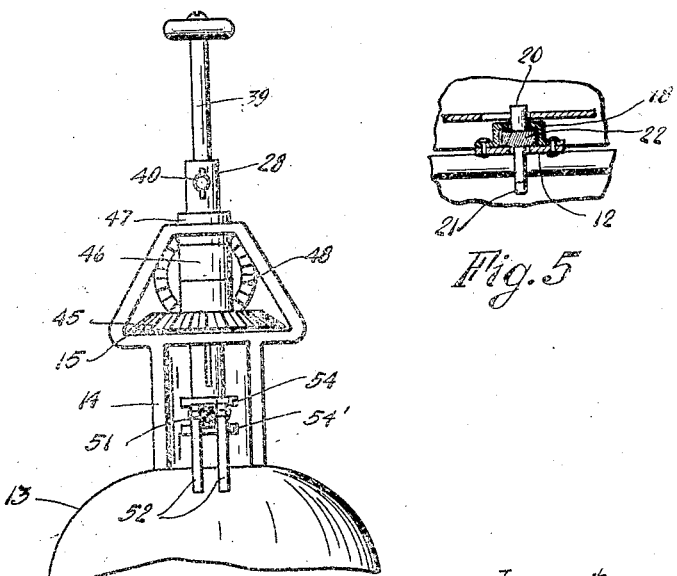

Patented May 26, 1925.

1,539,718

UNITED STATES PATENT OFFICE.

MAURICE L. CRUM, OF CHICAGO, ILLINOIS.

POT-WASHING DEVICE.

Application filed August 22, 1923. Serial No. 658,692.

*To all whom it may concern:*

Be it known that I, MAURICE L. CRUM, a citizen of the United States, and a resident of the city of Chicago, county of Cook, and State of Illinois, have invented certain new and useful Improvements in Pot-Washing Devices, of which the following is a specification.

My invention relates to pot washing devices, and has for its object to provide such a device which is readily adjustable to fit pots of various sizes, and is highly efficient in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical sectional view of my device mounted in an operative position on a pot;

Fig. 3 is a sectional view on line 3—3 of Fig. 1;

Fig. 4 is an elevational view of the operating mechanism, taken on line 4—4 of Fig. 1 and cutting the lifting lever, and Fig. 5 is a vertical section taken on line 5—5 of Fig. 1.

I have shown my invention in connection with an ordinary pot or kettle 10 having its upper edge turned outward forming a curved bead 11 on which the device is supported and firmly clamped as shown. This device contains, in a general way, means for supporting and clamping the device on a pot and which means is adjustable to fit pots of different sizes, means for cleaning the pot, means for adjusting and setting the cleaning means to suit the size of the particular pot, and means for rotating or operating the cleaning means.

Figure 1:
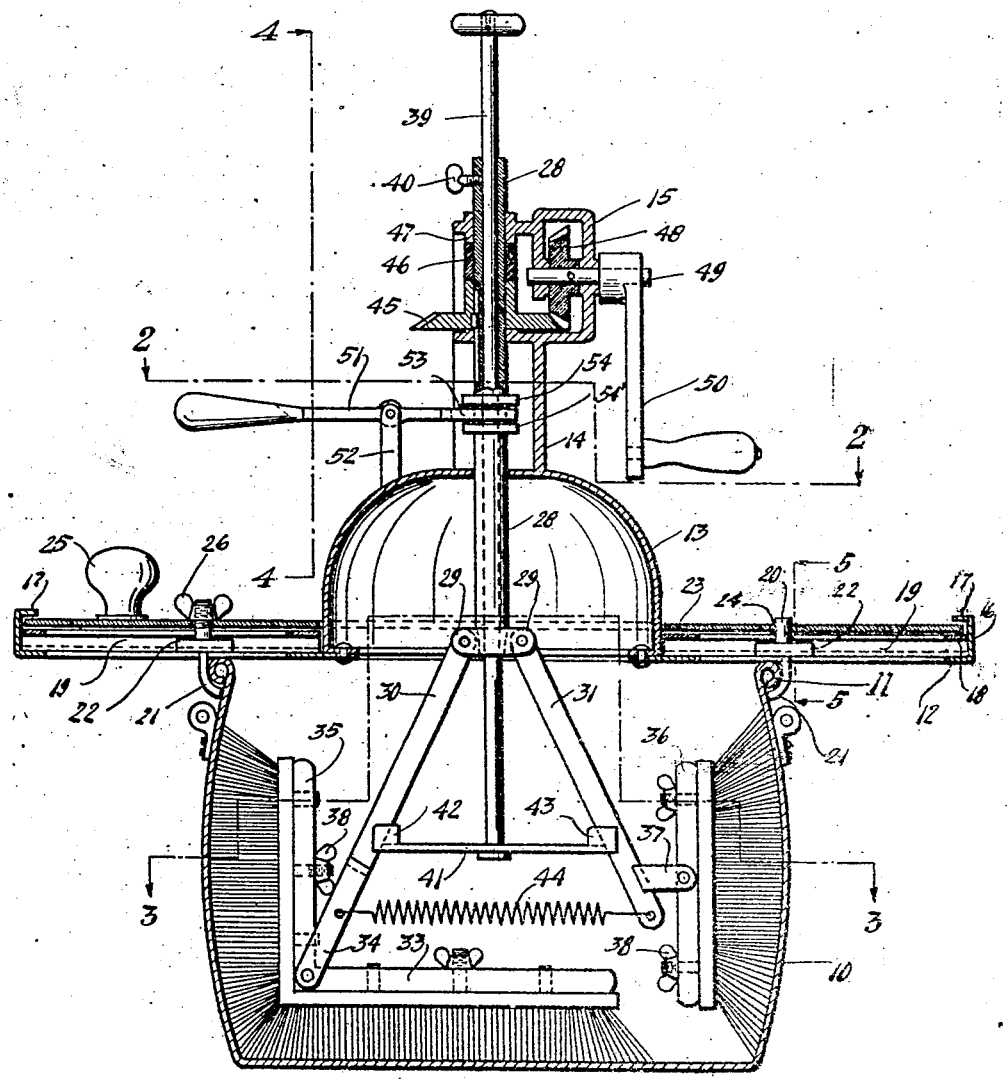
Figure 2:
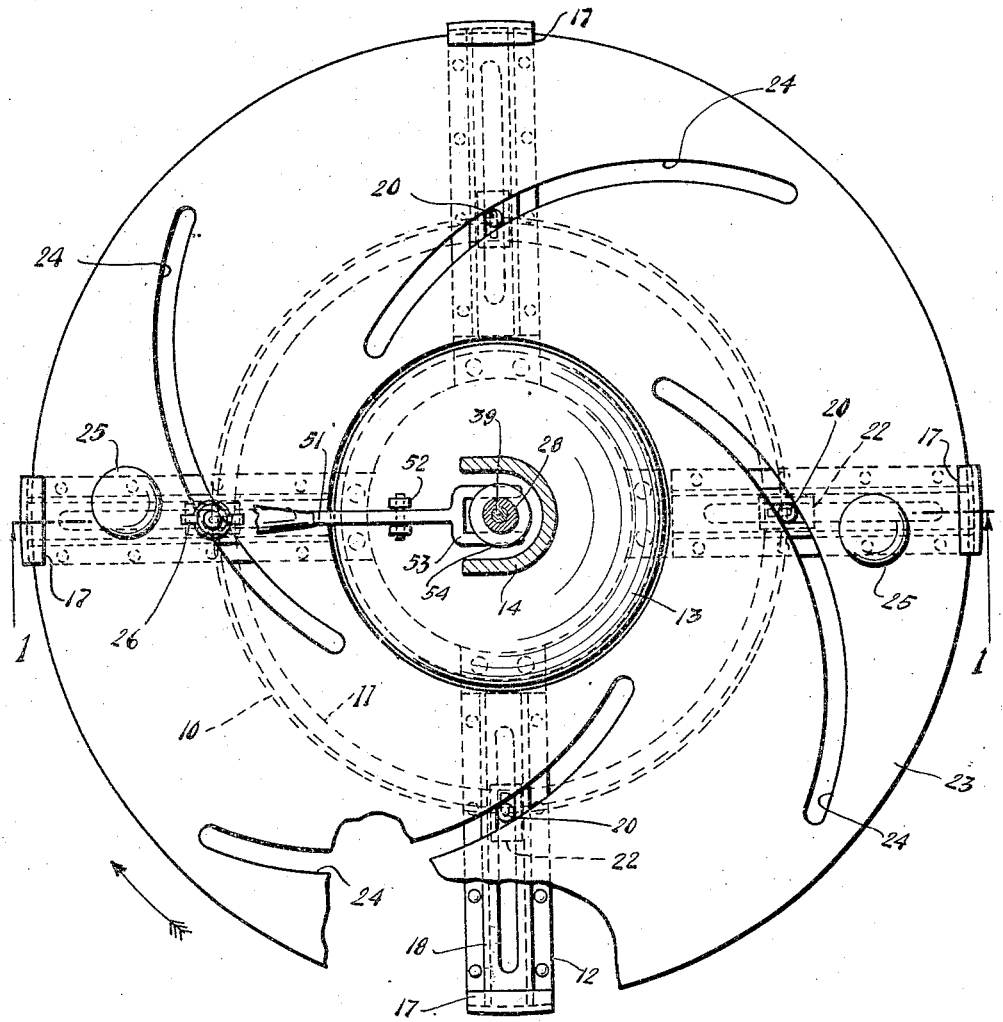
Fig. 2 is a plan view partly in section on line 2—2 of Fig. 1, the cover plate being partly broken away.

The particular form of my invention illustrated comprises in the supporting and fastening means a plurality of supporting bars 12 which preferably extend radially from and are fastened to a central dome or bracket 13 provided with an upwardly extending U-shaped bracket 14 carrying a gear housing 15 on its upper end, said housing 15 and dome 13 being made integral with bracket 14, or being otherwise attached thereto. The device is supported by bars 12 resting on the bead 11 of the pot, four of said bars being shown, but a larger or smaller number may be used equally as well. The lower member or supporting plate of each bar has an upturned outer end 16 with an inwardly turned lip 17, and an upper member or channelled plate 18 is riveted or otherwise suitably fastened to said lower plate, and therewith provides a space or chamber 19. A clamping pin or member 20 operates slidably in longitudinal slots in said upper and lower plates and is curved inward at its lower end 21 to engage under bead 11 and hold the device securely in position on the pot; while a small plate 22 is fastened on said pin and is held in its horizontal position in chamber 19 by means of said upper plate 18 and the lower parts of bars 12, to hold pin 20 in its upright position. A circular cover 23, with a central opening fitting over dome 13, is mounted on the upper plate 18, engaging beneath lip 17 of member 12, and is provided with forwardly and outwardly extending slots 24 in which the tops of pins 20 are arranged to slide. Knobs 25 are fastened on said cover by means of which the cover may be rotated in clockwise direction, as indicated by the arrow in Fig. 2, thereby forcing the pins 20 inward in slots 24 and in the slots in bar 12, toward the center of said cover so as to clamp the ends 21 of said pins tightly under the bead 11. This cover arrangement will thus fit or hold firmly on pots of various diameters, within the limits of said slots. A wing nut 26 is preferably threaded on one of said pins so that the cover elements may be locked firmly and positively in position on the pot.

The means for cleaning the pot comprises a tube or member 28 journalled vertically in housing 15 and dome 13, and provided with two pairs of ears 29 pivoted to the upper ends of links 30 and 31, an angular brush 33 being pivoted in a jaw 34 at the lower end of link 30, said brush being provided with a main horizontal portion for engaging the bottom of the pot and a vertical portion 35 preferably fixed thereto for engaging the side of the pot, while a vertical brush 36, similar to brush portion 35, is pivoted in a jaw 37 extending from the lower part of link 31.

The bristle bearing or cleaning portions of the brushes are preferably mounted removably on the holder portions, as by means of set screws 38, or in any suitable manner, and said bristles may consist of steel, hair, or vegetable fibers, or the cleaning portions may be provided with mineral wool as steel wool or aluminum wool, instead of the bristle portions, likewise scraping or scouring members of stone or metal may be substituted for the usual removable cleaning portions of the brushes where a pot contains firm sediment or incrustation.

The means for adjusting and setting the cleaning mechanism comprises a shaft 39 which is adjustably mounted in tube 28 and is held in position therein by means of a set screw 40. A cross bar 41 is mounted on the lower end of said shaft and contains a pair of jaws 42 and 43 for slidably engaging links 30 and 31 to move said links and their attached brushes transversely of the pot to suit the diameter of said pot, and a spring 44 connects the lower parts of said links and holds them in said jaws. The brushes are also swingable on their pivots to adjust themselves automatically to the curvature or contour of the pot.

The means for operating the device comprises a gear 45 mounted on tube 28, as by means of a key and slot or in a similar manner, to rotate therewith and to slide longitudinally thereon. A suitable collar 46 is interposed between said gear and the upper journal part 47 of housing 15, and a gear 48 meshes with gear 45 and is fastened on a shaft 49 journalled in said housing, a hand crank 50 being fastened to the outer end of shaft 49 to operate said gears and rotate the cleaning means. A control lever 51 is pivoted on a bracket 52 on dome 13, and contains a fork 53 engaging between flanges 54 and 54' provided on tube 28, to raise the tube and brushes in order to wash the upper part of the pot 10 with the rotating brushes.

The device will be made in several sizes, and each size is adjustable within certain limits, that is, the cleaning mechanism within the pot as well as the covering and fastening mechanism on the pot are adjustable to suit the various sizes. The smaller device for home or kitchen use will preferably be driven by hand operated means, while the larger device for use with larger pots and vessels, as are used in hotels and the like, will pref ably be driven by power means, such as an electric motor or the like.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A pot cleaning device comprising in combination, means for mounting said device on a pot to support it on the top rim of said pot, a housing on said means and provided with a bracket, a tube mounted in said housing to rotate and to slide longitudinally therein, a lever fulcrumed on said housing to engage and move said tube vertically in said housing, means to rotate said tube, members connected to the lower end of said tube, cleaning means on said members, spreading means associated with the lower parts of said members for adjusting them and the brushes radially of the pot, and means in said tube for controlling said spreading means to adjust said cleaning members.

2. A pot cleaning device comprising in combination, means to mount said device on a pot, a tube rotatably mounted on said means, links pivoted on said tube, brushes pivoted on said links, a rod in said tube, a bar extending across the lower part of said rod to slidably engage and positively separate said links, a spring connected to the lower parts of said links for retaining said links in engagement with said bar, and means in said tube to hold said rod and bar in set position.

3. A pot cleaning device comprising in combination, means for supporting the device on a pot, means thereon for clamping the bead of the pot, a cover mounted on said supporting means and arranged to be rotated thereon for moving said clamping means radially to fit pots of various sizes, bracket means on said supporting means, rotatable means in said bracket means, a plurality of cleaning members on said rotatable means, means for positively and definitely moving said cleaning means apart and resilient means for automatically urging them together to suit pots of various sizes, means for rotating said rotatable means and cleaning means, and lever means for elevating said rotatable means and cleaning means.

4. A pot cleaning device comprising in combination, means for supporting the device on a pot, means thereon for clamping the bead of the pot, a spirally slotted cover mounted on said supporting means and arranged to be rotated thereon for moving said clamping means radially to fit pots of various sizes, a dome with bracket means on said supporting means, a tube rotatably mounted in said bracket means, a plurality of cleaning members mounted with links on said tube, a shaft mounted through said tube and provided with a bar for positively and definitely spreading said links and cleaning members, means for rotating said tube and cleaning members, and a lever fulcrumed on said dome for elevating said tube and cleaning members during operation.

In testimony whereof I have signed my name to this specification in the presence of two subscribing witnesses.

MAURICE L. CRUM.

Witnesses:
LEO KANTRAW,
CLARENCE E. THREEDY.